(12) United States Patent
Helenius et al.

(10) Patent No.: US 11,230,458 B2
(45) Date of Patent: Jan. 25, 2022

(54) ROPE GRIPPING MEMBER OF A HOISTING APPARATUS, ROPE GRIPPING DEVICE, TERMINAL ARRANGEMENT AND HOISTING APPARATUS

(71) Applicant: Kone Corporation, Helsinki (FI)

(72) Inventors: Juha Helenius, Helsinki (FI); Jani Renvall, Helsinki (FI)

(73) Assignee: Kone Corporation, Helsinki (FI)

( * ) Notice: Subject to any disclaimer, the term of this patent is extended or adjusted under 35 U.S.C. 154(b) by 89 days.

(21) Appl. No.: 16/845,407

(22) Filed: Apr. 10, 2020

(65) Prior Publication Data

US 2020/0331725 A1 Oct. 22, 2020

(30) Foreign Application Priority Data

Apr. 17, 2019 (EP) .................................... 19169840

(51) Int. Cl.
*B66B 7/08* (2006.01)
*F16G 11/04* (2006.01)

(52) U.S. Cl.
CPC ............ *B66B 7/085* (2013.01); *F16G 11/044* (2013.01)

(58) Field of Classification Search
CPC .. B66B 7/085; B66B 5/22; B66B 5/18; F16G 11/044
See application file for complete search history.

(56) References Cited

U.S. PATENT DOCUMENTS

| 5,141,356 | A | * | 8/1992 | Chaize | .................... | E04C 5/122 |
| | | | | | | 254/29 A |
| 5,503,257 | A | * | 4/1996 | Sugita | ....................... | B66B 5/18 |
| | | | | | | 188/250 B |
| 5,964,320 | A | * | 10/1999 | Kato | ......................... | B66B 5/22 |
| | | | | | | 187/375 |
| 5,979,615 | A | * | 11/1999 | Thompson | ................ | B66B 5/18 |
| | | | | | | 188/251 A |
| 6,256,841 | B1 | * | 7/2001 | Ericson | ................... | B66B 7/085 |
| | | | | | | 24/136 R |
| 6,371,261 | B1 | * | 4/2002 | Thompson | ................ | B66B 5/22 |
| | | | | | | 187/370 |

(Continued)

FOREIGN PATENT DOCUMENTS

EP 3330210 A1 6/2018
EP 3366630 A1 8/2018

OTHER PUBLICATIONS

Extended European Search Report for Application No./Patent No. 19169840.6-1017, dated Oct. 25, 2019.

*Primary Examiner* — Michael A Riegelman
(74) *Attorney, Agent, or Firm* — Harness, Dickey & Pierce, P.L.C.

(57) ABSTRACT

The invention relates to rope gripping member for a rope gripping device, the rope gripping member comprising an elongated rope gripping face for being pressed against an elongated side face of an end section of a rope, the elongated rope gripping face having a longitudinal direction and a front edge and a rear edge; wherein tensile stiffness of the rope gripping member in longitudinal direction of the gripping face increases non-linearly with accelerating rate from the front edge towards the rear edge of the gripping face. The invention also relates to a rope gripping device, a rope terminal arrangement and a hoisting apparatus implementing the rope gripping member.

20 Claims, 4 Drawing Sheets

(56) References Cited

U.S. PATENT DOCUMENTS

| | | | | |
|---|---|---|---|---|
| 6,662,408 | B2* | 12/2003 | Perez | B66B 7/085 |
| | | | | 187/406 |
| 6,997,287 | B2* | 2/2006 | Sasaki | B66B 5/22 |
| | | | | 187/376 |
| 7,607,204 | B2* | 10/2009 | Ach | B66B 7/085 |
| | | | | 24/136 R |
| 8,505,173 | B2* | 8/2013 | Pitts | B66B 7/085 |
| | | | | 24/136 R |
| 9,422,134 | B2* | 8/2016 | Ikonen | B66B 7/085 |
| 10,214,385 | B2* | 2/2019 | Eastman | B33Y 80/00 |
| 2007/0240941 | A1* | 10/2007 | Fischer | B66B 5/22 |
| | | | | 187/359 |
| 2014/0182975 | A1 | 7/2014 | Ikonen et al. | |
| 2015/0307323 | A1* | 10/2015 | Zapf | B66B 7/062 |
| | | | | 187/411 |
| 2016/0185572 | A1* | 6/2016 | Lehtinen | F16G 11/044 |
| | | | | 187/411 |
| 2016/0207739 | A1* | 7/2016 | Pelto-Huikko | B66B 7/085 |
| 2016/0355378 | A1* | 12/2016 | Lehtinen | B66B 7/085 |
| 2017/0036891 | A1* | 2/2017 | Lehtinen | B66B 7/085 |
| 2017/0189952 | A1* | 7/2017 | Lampinen | B21D 53/58 |
| 2018/0155156 | A1* | 6/2018 | Kuczek | B66B 9/00 |
| 2018/0162697 | A1* | 6/2018 | Schmidt | B66B 7/085 |
| 2018/0208436 | A1* | 7/2018 | Schmidt | B66B 7/08 |
| 2020/0331725 | A1* | 10/2020 | Helenius | B66B 7/085 |

* cited by examiner

ROPE GRIPPING MEMBER OF A HOISTING APPARATUS, ROPE GRIPPING DEVICE, TERMINAL ARRANGEMENT AND HOISTING APPARATUS

RELATED APPLICATIONS

This application claims priority to European Patent Application No. 19169840.6 filed on Apr. 17, 2019, the entire contents of which are incorporated herein by reference.

FIELD OF THE INVENTION

The invention relates to gripping a rope of a hoisting apparatus. Said hoisting apparatus is preferably an elevator for vertically transporting passengers and/or goods.

BACKGROUND OF THE INVENTION

In hoisting apparatuses, it is typical that one or more ropes are used as the means by which the load to be hoisted is suspended. Each rope end needs to be fixed to a fixing base, which is typically either the load to be lifted or a stationary structure, depending on the type of suspension chosen for the elevator. In elevators, the rope ends can be fixed directly to the load, such as the car or counterweight, which is the case when these are to be suspended with 1:1 ratio. Alternatively, the rope ends can be fixed to a stationary structure of the building, which is the case when the car and counterweight are to be suspended with 2:1 ratio, for instance.

Ropes of an elevator typically include one or several load bearing members that are elongated in the longitudinal direction of the rope and each form a structure that continues unbroken throughout the length of the rope. Load bearing members are the members of the rope which are able to bear together the load exerted on the rope in its longitudinal direction. The load, such as a weight suspended by the rope, causes tension on the load bearing member in the longitudinal direction of the rope, which tension can be transmitted by the load bearing member in question all the way from one end of the rope to the other end of the rope. Ropes may further comprise non-bearing components, such as a coating, which cannot transmit tension in the above described way. The coating can be utilized for one or more purposes, such as for protecting the load bearing members and/or for facilitating engagement with rope wheels and/or for positioning adjacent load bearing members relative to each other, for example.

In prior art, elevator rope ends have been fixed to the fixing base with various different rope terminal arrangements. The rope structure limits the way in which it can be engaged. Uncoated ropes containing metallic load bearing members can typically be fixed relatively freely without risk of severe rope damage. Ropes that have load bearing members made of brittle material and/or a coating, however, cannot be fixed as freely. Load bearing members may be sensitive to bending, and the material of the coating and/or the material of the load bearing members cannot withstand great local compression. This kind of ropes have been fixed by compressing them with a straight and long compression face without bending any part of the rope end. Such a rope terminal arrangement has been contemplated, for example as shown in US2014/0182975A1, where the rope end is compressed in a gap defined by two gripping members. Thereby, it is subjected to compression in its transverse direction and tensile loading in its longitudinal direction.

Reliability of this kind of configuration relies largely on the grip produced by the compression between the rope surface and the gripping member. The rope end section should be firmly gripped such that it is not able to slide out of the compression gap, because this would mean that the suspension of the particular rope would be lost. This type of rope terminal arrangement has the drawback that a reliable grip is difficult to provide. This is the case particularly with ropes, such as coated ropes, where the surface of the rope end is made of material sensitive to deformation under stress, such as elastic polymer materials, like polyurethane, for instance. The surface material is subjected to continuous shear stress, which may cause increasing deformation over time (creep). In long term, the creep phenomenon can lead to rupture of the surface material. For example, the coating of the rope may elongate to its breaking point and/or its adherence with the load bearing members of the ropes is lost. This may lead to slipping of the rope end out from its place and in the worst case unexpected loss of suspension of the particular rope.

BRIEF DESCRIPTION OF THE INVENTION

The object of the invention is to provide a rope gripping member for a gripping device of a hoisting apparatus, a gripping device of a hoisting apparatus, a rope terminal arrangement for a hoisting apparatus and a hoisting apparatus whereby safety of a hoisting apparatus, and in particular rope gripping thereof, is improved. An object is particularly to alleviate one or more of the above discussed problems of prior art and/or problems discussed or implied elsewhere in the description. Advantageous embodiments are presented, inter alia, where a firm and reliable gripping is achieved with reduced likelihood of ruptures caused by creep or excessive compression or excessive internal stresses in the rope being gripped. Advantageous embodiments are presented, inter alia, which are well suitable for firmly and reliably fixing ropes where the surface material is sensitive for shear stress caused issues, such as for ropes where the surface material comprises polymer, such as coated ropes in particular. Advantageous embodiments are presented, inter alia, which are well suitable for safely fixing ropes comprising load bearing members made of brittle material not tolerating powerful local compression, such as load bearing members made of fiber reinforced composite material in particular. Advantageous embodiments are presented, inter alia, which are well suitable for safely fixing ropes comprising load bearing members made of material where outermost parts of its load bearing members are sensitive to high local shear stress in its surface, such as load bearing members made of fiber reinforced composite material in particular.

It is brought forward a new rope gripping member for a rope gripping device, the rope gripping member comprising an elongated rope gripping face for being pressed against an elongated side face of an end section of a rope, the elongated rope gripping face having a longitudinal direction and a front edge and a rear edge; wherein the tensile stiffness of the rope gripping member in longitudinal direction of the gripping face increases non-linearly with accelerating rate from the front edge towards the rear edge of the gripping face. With this solution one or more of the above mentioned objects are achieved. Particularly, by adjusting stiffness of the gripping member to be as described above, shear stresses can be made more equal over the contact length between the gripping member and the rope. Hereby, particularly existence of very high and thereby harmful shear stresses close to the front edge of the gripping face can be eliminated. Equalized stress distribution reduces likelihood of ruptures of the rope, such as creep related ruptures in particular, but also ruptures caused by local internal stresses within load bearing members of the rope, which may cause exceeding breaking load of the load bearing member in question.

Preferable further details are introduced in the following, which further details can be combined with the gripping member individually or in any combination.

In a preferred embodiment, steepness of the tensile stiffness plot of the rope gripping member increases from the front edge towards the rear edge of the gripping face, said stiffness plot presenting tensile stiffness (in longitudinal direction of the gripping face) of the gripping member in different points along longitudinal direction of the gripping face.

In a preferred embodiment, said different points are displaced along the length of the rope gripping face and include a point within the first quarter of the rope gripping face, a point within the second quarter of the rope gripping face, and a point within the third quarter of the rope gripping face, and a point within the fourth quarter of the rope gripping face.

In a preferred embodiment, each said point is located within the central third of the quarter as seen in longitudinal direction of the rope gripping face.

In a preferred embodiment, the rope gripping member is wedge-shaped.

In a preferred embodiment, the gripping face is planar. The gripping face being planar facilitates gentleness of the fixing, since no pointlike compression nor bending of the end section of the rope 4 is needed. The planar gripping face may be smooth but this is not necessary since it can comprise an uneven surface pattern for facilitating grip between the gripping face and the rope, such as a knurling pattern or a polyvee pattern or a tooth pattern.

In a preferred embodiment, the gripping face comprises an uneven surface pattern for facilitating grip between the gripping face and the rope, such as a knurling pattern or a polyvee pattern or a tooth pattern. Thus, firmness of the engagement with the rope can thus be facilitated.

In a preferred embodiment, rope gripping member has a planar back face, the gripping face and the planar back face being at an acute angle relative to each other.

In a preferred embodiment, the rope gripping member comprises one or more cavities. The cavities are preferably empty.

In a preferred embodiment, the ratio Vc/Vs, wherein Vc is the overall volume of the cavities of a quarter, and Vs is the overall volume of the solid parts of the quarter in question, varies between said quarters, the ratio being smallest in the fourth quarter.

In a preferred embodiment, in said different points the rope gripping face tensile stiffness of the rope gripping member in longitudinal direction L is substantially in accordance with the following: stiffness(x)=x/(l−x)*one or more coefficients, where l is the length of the gripping face in longitudinal direction L, and x is the distance in said longitudinal direction L from the front edge of the gripping face.

In a preferred embodiment, said one or more coefficients include coefficient1 and coefficient2, where coefficient1=EA and coefficient2=0.5, where E is E-modulus of the load bearing members of the rope, and A is cross sectional area of the the load bearing members of the rope, and l is the length of the gripping face.

In a preferred embodiment, the tensile stiffness of the rope gripping member in longitudinal direction L is in accordance with the following: S4≥10S1; and S4≥2S3; and S3≥S2; and S2≥S1; wherein S1 is a tensile stiffness of the rope gripping member at a point of the first quarter of the rope gripping face, and S2 is a tensile stiffness of the rope gripping member at a point of the second quarter of the rope gripping face, and S3 is a tensile stiffness of the rope gripping member at a point of the third quarter of the rope gripping face, and S4 is a tensile stiffness of the rope gripping member at a point of the fourth quarter of the rope gripping face.

In a preferred embodiment, the tensile stiffness of the rope gripping member is in accordance with the following: S4≥30S1; and S4≥3S3; and S32≥S2; and S2≥S1

In a preferred embodiment, the tensile stiffness of the rope gripping member is further in accordance with the following: S3<15S1; and S2<5S1.

In a preferred embodiment of a first kind, the rope gripping member is made of composite material or at least comprises composite material. In the latter case, preferably more than half of the volume of the rope gripping member consists of composite material. The composite material preferably comprises reinforcing fibers embedded in polymer matrix, said reinforcing fibers preferably being non-metallic fibers, preferably carbon fibers or glass fibers. With fiber reinforced composite material, the rope gripping member can be given a desired stiffness sufficient for firm gripping with lightweight structure, which are advantageous for firm gripping and economical movability, and thereby advantageous for use in hoisting devices such as elevators. Said rope gripping member, which is made of composite material or at least comprises composite material, is preferably formed by injection molding. This is advantageous since injection molding facilities cost effective manufacturing of the gripping member also if it has a complicated shape.

In general, it is preferable that the reinforcing fibers of the composite material of the gripping member are short fibers, meaning here that at least majority of the reinforcing fibers, i.e. more than 50% of them, are 0.1 mm-1.0 mm long. Most preferably, majority of the reinforcing fibers of the composite material of the gripping member, i.e. more than 50% of them, are 0.1 mm-0.5 mm long. With the above mentioned fiber lengths, a strong and uniformly reinforced structure can be achieved. This also facilitates manufacturing of the gripping member by injection molding. Preferably, at least majority of the reinforcing fibers of the gripping member, i.e. more than 50% of them, are oriented parallel with or at an angle less than of 45 degrees from the longitudinal direction L of the gripping face. Hereby, a great portion of the reinforcing fibers of the gripping member is oriented parallel or close to parallel direction with the gripping face. This improves stiffness of the gripping member in this direction. The direction of reinforcing fibers can be roughly controlled by controlling direction of flow of the material at injection molding of the gripping member, for instance.

Preferably, 20-80% of the volume of the composite material of the rope gripping member 2 consists of said reinforcing fibers. More preferably, 50-70%, most preferably 55-65% of the volume of the composite material of the rope gripping member 2 consists of said reinforcing fibers. With these ranges, good results in stiffness and uniformity of the gripping member can be achieved.

In a preferred embodiment of a second kind, the rope gripping member comprises metal, preferably aluminum or steel. Then, preferably, more than half of the volume of the rope gripping member consists of metal, preferably aluminum or composite material.

In a preferred embodiment, cross sectional area of the rope gripping member increases between the front edge and the rear edge of the gripping face with accelerating rate. This can be achieved by forming suitably cavities in the rope gripping member, for instance.

In a preferred embodiment, the rope gripping member comprises one or more of the following:
- plurality of cavities of different lengths (as measured in direction L) at different points along the length of the rope gripping face,
- plurality of cavities of different widths (as measured in direction w) at different points along the length of the rope gripping face, or a single cavity the width of which is different at different points along the length of the rope gripping face,
- plurality of cavities of different thickness (as measured in direction t) at different points along the length of the rope gripping face or a single cavity the thickness of which is different at different points along the length of the rope gripping face,
- plurality of cavities of different volume at different points along the length of the rope gripping face or a single cavity the the cross sectional area of which is different at different points along the length of the rope gripping face.

In a preferred embodiment, the rope gripping member comprises base material portion and one or more stiffness adjusting material parts, wherein material of said one or more stiffness adjustment material parts has substantially lower or higher module of elasticity than the material of the base material portion, and the cross-sectional area covered by the one or more stiffness adjusting material parts changes as function of x such that the tensile stiffness of the rope gripping member in longitudinal direction of the gripping face increases non-linearly with accelerating rate from the front edge towards the rear edge of the gripping face.

In a preferred embodiment, the rope gripping member comprises base material portion and stiffness adjusting material part forming a layer of the rope gripping member, wherein material of said stiffness adjustment material part has substantially lower or higher module of elasticity than the material of the base material portion, and the cross-sectional area covered by the stiffness adjusting material part changes as function of x such that the tensile stiffness of the rope gripping member as measured in longitudinal direction of the gripping face increases non-linearly with accelerating rate from the front edge towards the rear edge of the gripping face.

In a preferred embodiment, the rope is belt-shaped.

In a preferred embodiment, the rope is a coated rope.

In a preferred embodiment, the rope comprises one or more elongated load bearing members embedded in a coating and extending parallel with the longitudinal direction of the rope unbroken throughout the length of the rope. The coating preferably forms partly or completely the outer surface of the rope.

In a preferred embodiment, the coating is made of or at least comprises polymer material, such as polyurethane, rubber or silicon, for instance. Most preferably, the polymer material is polyurethane. Polyurethane is durable and in general well suitable for hoisting apparatus use.

In a preferred embodiment, the load bearing members are made of composite material comprising reinforcing fibers embedded in polymer matrix, said reinforcing fibers preferably being carbon fibers.

In a preferred embodiment, the reinforcing fibers are distributed evenly or at least substantially evenly in polymer matrix and bound to each other by the polymer matrix. Furthermore, preferably, over 50% of the cross-sectional square area of the load bearing member consists of said reinforcing fibers. Thereby, a high tensile stiffness can be facilitated. Preferably, the load bearing members cover together at least 25% proportion of the cross-section of the rope, most preferably over 50% proportion of the cross-section area of the rope.

In a preferred embodiment, the width/thickness ratio of the rope is more than two, preferably more than 4.

In a preferred embodiment, the reinforcing fibers are not twisted together. Instead, it is preferable that the reinforcing fibers of each load bearing member are parallel with the longitudinal direction of the load bearing member. Thereby the fibers are also parallel with the longitudinal direction of the rope as each load bearing member is oriented parallel with the longitudinal direction of the rope. This facilitates further the longitudinal stiffness of the rope.

In a preferred embodiment, said gripping face of the profile bar is provided with an uneven surface pattern.

In a preferred embodiment, said uneven surface pattern is a toothing or a polyvee or a knurling-pattern.

The tensile stiffness of the rope gripping member is preferably the tensile stiffness of the rope gripping member as measured in longitudinal direction of the gripping face. Preferably, the tensile stiffness of the rope gripping member in longitudinal direction of the gripping face is particularly as measured in longitudinal direction of the gripping face by a testing arrangement where strain gauges are positioned on the gripping face, preferably simultaneously or sequentially, at different points of the gripping face in direction to measure strain in this direction when a pull is directed on the rope gripping member in this direction.

In a preferred embodiment, the one or more cavities comprises one or more cavities that are empty and/or one or more cavities filled with substance.

In a preferred embodiment, gripping member is in contact with the rope only via the gripping face.

In a preferred embodiment, the gripping face is fitted for being pressed against an elongated side face of the end section of the rope such that the rope gripping face and the rope end section pressed by it extend both straight and parallel to each other. The longitudinal direction of the gripping face is preferably aligned with the longitudinal direction of the end section of the rope pressed by the rope gripping face.

It is also brought forward a new rope gripping device comprising a frame and one or more rope gripping members mounted or at least suitable for being mounted on the frame, wherein said rope gripping member is as defined anywhere above or in any of the claims of the application.

With this solution one or more of the above mentioned objects are achieved. Particularly, when stiffness of the gripping member has been adjusted to be as described above, shear stresses are more equal over the contact length between the gripping member and the rope. Hereby, particularly existence of very high and thereby harmful shear stresses close to the front edge of the gripping face are eliminated. Equalized stress distribution reduces likelihood of ruptures of the rope, such as creep related ruptures in particular, but also ruptures caused by local internal stresses within load bearing members of the rope, which may cause exceeding breaking load of the load bearing member in question.

Preferable further details have been introduced above and will be introduced in the following, which further details can be combined with the rope gripping device individually or in any combination.

In a preferred embodiment, the frame comprises a tapering nest for receiving a rope section of a rope to be gripped and the one or more gripping members, in particular on one or two opposite sides of the rope section of a rope to be gripped.

It is also brought forward a new rope terminal arrangement comprising a rope gripping device, which is as defined anywhere above or in any of the claims of the application, and an elongated rope, the gripping face of each gripping member being pressed against an elongated side face of an end section of the rope. With this solution one or more of the above mentioned objects are achieved.

Preferable further details have been introduced above and will be introduced in the following, which further details can be combined with the rope terminal arrangement individually or in any combination.

In a preferred embodiment, the rope gripping device comprises on one or two opposite sides of the section of a rope to be gripped a rope gripping member, the gripping face of each said rope gripping member being pressed against an elongated side face of an end section of the rope.

In a preferred embodiment, each said gripping member and a section of a rope to be gripped are mounted within a tapering nest of the frame; and each said gripping member is wedged in the tapering nest, or at least movable to wedge in the tapering nest, such that the gripping face thereof is pressed against an elongated side face of the end section of the rope for locking it into the tapering nest immovably relative to the frame.

In a preferred embodiment, the complete length of the rope pressed by the gripping face is straight. Thus, no bending is caused by this pressing of the rope. This is advantageous particularly when the rope contains fragile parts sensitive to bending.

It is also brought forward a new hoisting apparatus. The hoisting apparatus comprises a rope gripping device or a rope terminal arrangement which is as defined anywhere above or in any of the claims of the application. With this solution one or more of the above mentioned objects are achieved.

Preferable further details have been introduced above and will be introduced in the following, which further details can be combined with the hoisting apparatus individually or in any combination.

In a preferred embodiment, the hoisting apparatus is an elevator, such as an elevator for vertically transporting passengers and/or goods.

In a preferred embodiment, the rope is a coated rope.

In a preferred embodiment, the rope comprises one or more elongated load bearing members embedded in a coating and extending parallel with the longitudinal direction of the rope unbroken throughout the length of the rope.

In a preferred embodiment, each said load bearing member is are made of composite material comprising reinforcing fibers embedded in polymer matrix, said reinforcing fibers preferably being carbon fibers.

In a preferred embodiment, the rope gripping device is arranged to fix a rope of the hoisting apparatus to a fixing base, the hoisting apparatus preferably being an elevator and said fixing base preferably being an elevator car or a counterweight or a stationary structure of a building wherein the elevator is installed.

In a preferred embodiment, the elongated rope comprises on the front edge side of the gripping face a rope section under tension, wherein the tensioned rope section suspends one or more loads of a hoisting apparatus, the one or more loads preferably including an elevator car and/or a counterweight.

The aforementioned elevator is preferably such that the car thereof is arranged to serve two or more landings. The elevator preferably controls movement of the car in response to signals from user interfaces located at landing(s) and/or inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
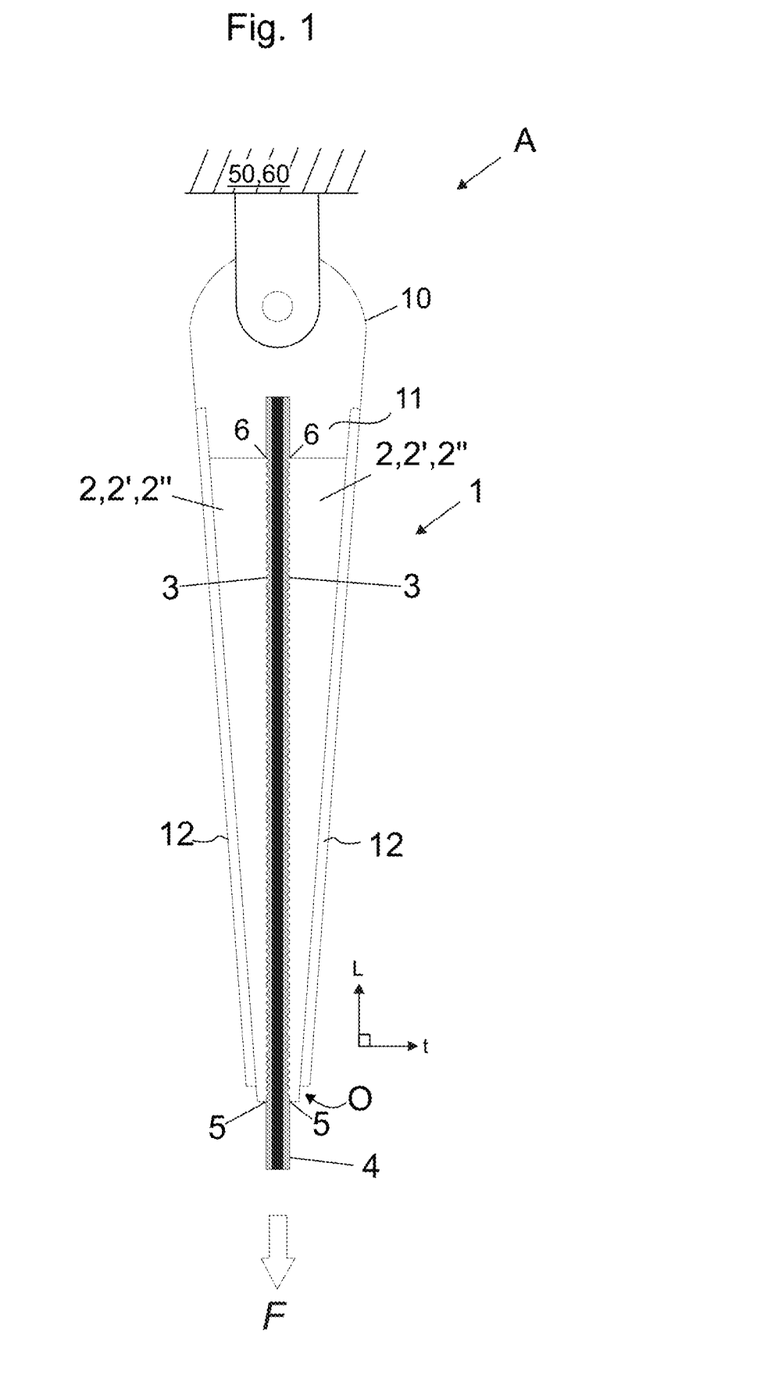
FIG. 1 illustrates a rope gripping member according to an embodiment, a rope gripping device according to an embodiment, a rope terminal arrangement of a hoisting apparatus according to an embodiment.

FIG. 1 illustrates a rope terminal arrangement A of a hoisting apparatus comprising a rope gripping device 1, and an elongated rope 4 of a hoisting apparatus. The rope gripping device 1 comprises a frame 10 and two rope gripping members 2.

Each rope gripping member 2 comprises an elongated rope gripping face 3 for being pressed against an elongated side face 3 of an end section of the rope 4, the elongated rope gripping face 3 having a longitudinal direction L and a front edge 5 and a rear edge 6.

The two rope gripping members 2 are mounted on the frame 10 such that the rope gripping face 3 of each of them is pressed against an elongated side face of the rope 4.

Figure 2:
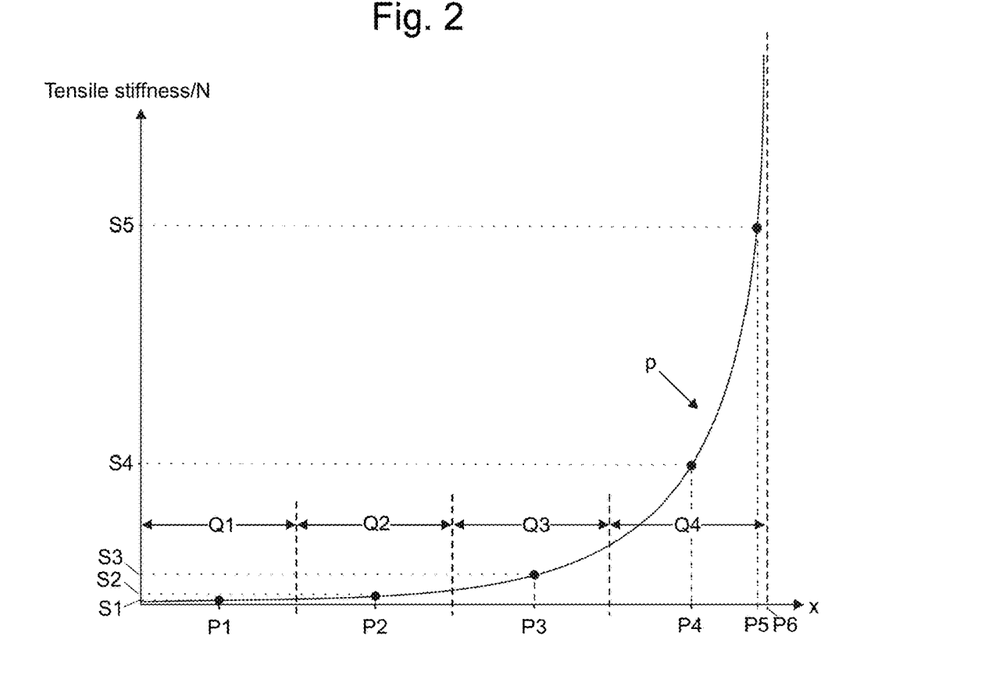
FIG. 2 illustrates a tensile stiffness-plot of an embodiment of a rope gripping member as function of x.

FIG. 2 illustrates a tensile stiffness-plot of each said rope gripping member 2 as function of x, wherein x is the distance in said longitudinal direction L from the front edge 5 of the gripping face 3, presenting the tensile stiffness of the gripping member 2 in different points P1-P4 along longitudinal direction L of the gripping face 3.

In FIG. 2, S1 is a tensile stiffness of the rope gripping member 2 at a point P1 of the first quarter Q1 of the rope gripping face 3, and S2 is a tensile stiffness of the rope gripping member 2 at a point P2 of the second quarter of the rope gripping face 3, and S3 is a tensile stiffness of the rope gripping member 2 at a point P3 of the third quarter Q3 of the rope gripping face 3, and S4 is a tensile stiffness of the rope gripping member 2 at a point P4 of the fourth quarter Q4 of the rope gripping face 3.

The tensile stiffness of each said rope gripping member 2 in longitudinal direction L of the gripping face 3 increases non-linearly with accelerating rate from the front edge 5 towards the rear edge 6 of the gripping face 3. By adjusting stiffness of the gripping member 2 to be as described above, shear stresses over the contact length between the gripping member 2 and the rope 4 are equalized. Particularly, hereby existence of very high and thereby harmful local shear stresses close to the front edge 5 of the gripping face 3 can be eliminated. Otherwise, in this location peaks in shear stress would be particularly likely to occur. Reducing excessive stresses close to the front edge 5 of the gripping face 3 reduces likelihood of ruptures, in particular creep ruptures, in this location, where they would otherwise be relatively likely. In the following, preferable further features are described by which equalization of shear stresses over the contact length between the gripping member 2 and the rope 4 can be further facilitated.

Steepness of the tensile stiffness plot p of the rope gripping member 2 increases from the front edge 5 towards the rear edge 6 of the gripping face 3, said stiffness plot presenting tensile stiffness of the gripping member 2 in different points P1-P4 along longitudinal direction L of the gripping face 3.

Said different points P1-P4 are displaced along the length of the rope gripping face 3 and include a point P1 within the first quarter Q1 of the rope gripping face 3, a point P2 within the second quarter of the rope gripping face 3, and a point P3 within the third quarter Q3 of the rope gripping face 3, and a point P4 within the fourth quarter Q4 of the rope gripping face 3. Each said point P1,P2,P3,P4 is located within the central third of the quarter Q1-Q4 in question as seen in longitudinal direction L of the rope gripping face 3.

Adjusting the tensile stiffness of a rope gripping member 2 in longitudinal direction L of the gripping face 3 to be such that a desired tensile stiffness-plot is achieved can be done by numerous different methods, such as by adjusting material distribution of the rope gripping member, or adjusting material properties within the rope gripping member 2, for instance. Said adjusting material distribution of the rope gripping member can be implemented by providing cavities within the gripping member and by adjusting the volume of the cavities such that a desired tensile stiffness plot is realized. Said adjusting material properties within the rope gripping member 2 an be implemented by forming the rope gripping member 2 of at least two materials of different stiffness, such as of two materials as compound or as a layered structure, or as embedded structure, and changing the ratio of the two materials as function of distance x from the front edge 5, in particular the proportion of the stiffer material increasing as function of distance x from the front edge 5. These are both advantageous alternative methods since they allow adjusting the tensile stiffness plot of the rope gripping member 2 without necessarily affecting the shape thereof. Particularly, a wedge shaped rope gripping member 2 can thus be manufactured with a desired tensile stiffness plot.

The two rope gripping members 2 are mounted on the frame 10 such that the rope gripping face 3 of each of them is pressed against an elongated side face 3 of the rope 4.

The rope 4 presented is belt-shaped and the gripping face 3 is planar. The gripping face 3 being planar facilitates gentleness of the fixing, since no pointlike compression nor bending of the end section of the rope 4 is needed. Although the gripping face 3 is planar, it may not be smooth but can comprise an uneven surface pattern for facilitating grip between the gripping face 3 and the rope 4, such as a knurling pattern, as illustrated in the drawings. Alternatively, the uneven surface pattern could be a polyvee pattern or a tooth pattern, for example. In cases where the gripping face 3 is planar and comprises an uneven surface pattern, the highest tips of the surface pattern, such as the tips of ridges or peaks of the surface pattern, are on the same plane.

The aforementioned frame 10 comprises a tapering nest 11 for receiving the gripping members 2 and a rope section of a rope 4 to be gripped. Tapering shape facilitates use of a wedging effect to provide compression of the rope by the gripping members 2. The tapering nest 11 tapers towards an opening O through which the rope 4 is arranged to pass.

The rope gripping device 1 comprises on two opposite sides of the rope a rope gripping member 2 the gripping face 3 of each said rope gripping member 2 being pressed against an elongated side face of the rope.

Said gripping members 2 and the section of a rope 4 to be gripped are particularly mounted inside the tapering nest 11 of the rope terminal frame 10 on opposite sides of the rope, in particular such that they are wedged/movable to wedge in the tapering nest 11, in particular between a wall 12 of the tapering nest 11 and an end section of the rope 4 placed into the tapering nest 11, such that the gripping face 3 thereof is pressed against an elongated side face Sf1,Sf2 of the section rope for locking the end of the rope into the nest 11 immovably relative to the rope terminal frame 10.

Using two gripping members 2 configured to receive the end section of the rope 4 between them is, however, not necessary as the solution could alternatively have a gripping member 2 of the above described kind on only one side of the end section of the rope 4, such as like presented in US2014/0182975A1. In this case, one wall of the frame 10 could be adapted to give reaction force for achieving proper compression by only one movably mounted gripping member 2, for instance.

For facilitating use of a wedging effect to provide compression of the rope by the rope gripping members 2, preferably each said rope gripping member 2 is wedge-shaped. In the preferred embodiments, the gripping face 3 is planar and each said wedge-shaped rope gripping member 2 has a planar back face, the gripping face 3 and the planar back face being at an acute angle relative to each other. The gripping face 3 is a face for being placed against a rope and the back face is a face for being placed against an inner wall of the tapering nest 11 to slide against it for enabling wedging.

Figure 3A:
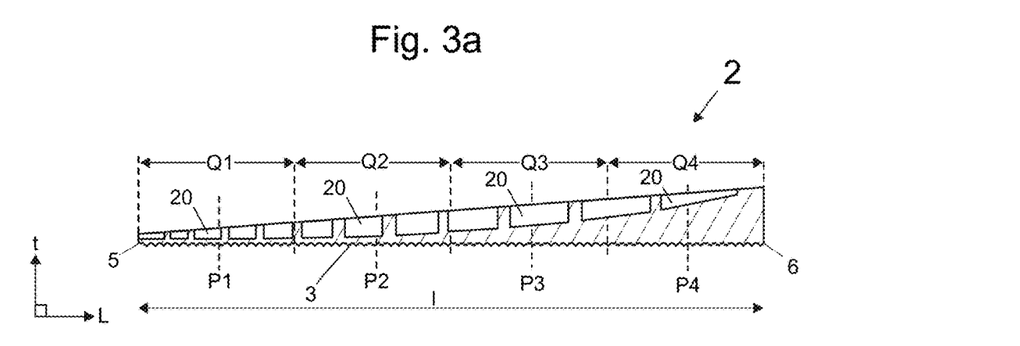
FIG. 3a illustrates a cross-section of a first embodiment of a gripping member of as viewed from a lateral side.
Figure 3B:
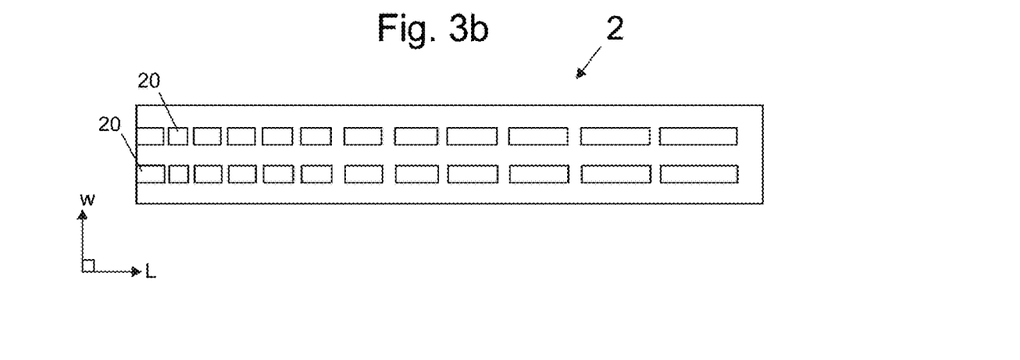
FIG. 3b illustrates a cross-section of an embodiment of a gripping member as viewed from the back-side.

FIGS. 3a and 3b illustrate a rope gripping member 2 where it comprises plurality of cavities 20. Preferably, the ratio Vc/Vs, wherein Vc is the overall volume of the cavities 20 of a quarter, and Vs is the overall volume of the solid parts of the quarter in question, varies between said quarters Q1-Q4. The proportion of cavity volume can be adjusted to change as function of x such that a desired tensile stiffness-plot is achieved. Preferably, the ratio Vc/Vs is smallest in the fourth quarter Q4. Preferably, the ratio Vc/Vs is smaller in the fourth quarter Q4 than in the third quarter $Q^3$.

The rope gripping member 2 can be more specifically such that in said different points P1-P4 the rope gripping face 3 tensile stiffness of the rope gripping member 2 is substantially in accordance with the following:

$$stiffness(x)=(x/(l-x))*\text{one or more coefficients}$$

where l is the length gripping face 3, and x is the distance in said longitudinal direction L from the front edge 5 towards the rear edge 6 of the gripping face 3. Here said substantially means that the stiffness of the rope gripping member 2 differs less than 10% of the stiffness calculated by said formula.

Said one or more coefficients preferably include coefficient1 and coefficient2, where coefficient1=EA and coefficient2=0.5, where E is E-modulus of the load bearing members 2 of the rope, and A is cross section area the load bearing members 2 of the rope.

For obtaining advantages of reduced likelihood of ruptures through equalized stress distribution over the length of the contact length between the gripping member 2 and the rope 4, it is not necessary that the tensile stiffness-plot follows exactly what is presented in FIG. 2. Hereinafter preferred criteria, which facilitate reduction of likelihood of ruptures, are presented. Preferably, the load bearing member 2 is constructed such, e.g. by suitable dimensioning, shaping, and by material selections, that the tensile stiffness of the rope gripping member 2 is in accordance with the following criteria:

$$S4 \geq 10 S1; \text{ and}$$

$$S4 \geq 2 S3; \text{ and}$$

$$S3 \geq S2; \text{ and}$$

$$S2 \geq S1.$$

Preferably, the load bearing member 2 is more specifically constructed such that the tensile stiffness of the rope gripping member 2 is in accordance with the following criteria:

$$S4 \geq 30 S1; \text{ and}$$

$$S4 \geq 3 S3; \text{ and}$$

$$S3 \geq 2 S2; \text{ and}$$

$$S2 \geq S1.$$

Preferably, the load bearing member 2 is more specifically constructed such that the tensile stiffness of the rope gripping member 2 is in accordance with the following criteria:

$$S3 < 15 S1; \text{ and}$$

$$S2 < 5 S1.$$

Structurally, it is preferable that the rope gripping member 2 is made of composite material or at least comprises composite material. In the latter case, preferably more than half of the volume of the rope gripping member 2 consists of composite material. The composite material preferably comprises reinforcing fibers embedded in polymer matrix, said reinforcing fibers preferably being non-metallic fibers, preferably carbon fibers or glass fibers, but possibly some other fibers such as aramid fibers. The rope gripping member 2, which is made of composite material or at least comprises composite material is preferably formed by injection molding. This is advantageous since this facilities cost effective manufacturing of the gripping member 2 also if it has a complicated shape. In general, it is preferable that the reinforcing fibers of the composite material of the gripping member 2 are short fibers, meaning here that majority of the reinforcing fibers of the composite material of the gripping member, i.e. more than 50% of them, are preferably within range 0.1 mm-1.0 mm long. Most preferably, majority of the reinforcing fibers of the composite material of the gripping member, i.e. more than 50% of them, are 0.1 mm-0.5 mm long. Hereby, a reinforced structure with uniform structure can be achieved. This also facilitates injection molding of the gripping member 2.

Preferably, at least majority of the reinforcing fibers of the gripping member 2, i.e. more than 50% of them, are oriented parallel with or at an angle less than of 45 degrees from the longitudinal direction L of the gripping face. Hereby, a great portion of the reinforcing fibers of the gripping member 2 is oriented parallel or close to parallel direction with the gripping face. This improves (increases) stiffness of the gripping member 2 in this direction. The direction of reinforcing fibers can be roughly controlled by controlling direction of flow of the material at injection molding of the gripping member, for instance.

Preferably, 20-80% of the volume of the aforementioned composite material of the rope gripping member 2 consists of said reinforcing fibers. More preferably, 50-70%, most preferably 55-65% of the volume of the composite material of the rope gripping member 2 consists of said reinforcing fibers. With these ranges, good results in stiffness and uniformity of the gripping member can be achieved.

The matrix material of the composite material of the gripping member 2 can be any common engineering polymer such as polyamide (PA), polyphenylene sulfide (PPS), polyoxymethylene (POM), polyphenylenether (PPE), polyethylene (PE), polycarbonate (PC), polystyrene (PS, ABS, ASA, SAN), polypropylene (PP) or polyester (PET, PBT), for instance. The matrix material can comprise additives for adjusting its properties such as increasing heat resistance, increasing UV-resistance, increasing chemical resistance, increasing or decreasing friction, adjusting optical properties, reducing or increasing electric conductivity or aging.

As an alternative to the aforementioned composite material, the rope gripping member 2 can be made of polymer material. That is, it is not necessary, although preferable, that the polymer material of the rope gripping member 2 is reinforced by reinforcing fibers. The rope gripping member 2, which is made of polymer material is preferably formed by injection molding.

As a further alternative to the aforementioned composite material, the rope gripping member 2 can be made of metal, or the rope gripping member 2 at least comprises metal. In the latter case, preferably more than half of the volume of the rope gripping member 2 consists of metal. The metal is preferably aluminum or steel, or other suitable metal or metal alloy.

Figure 4:
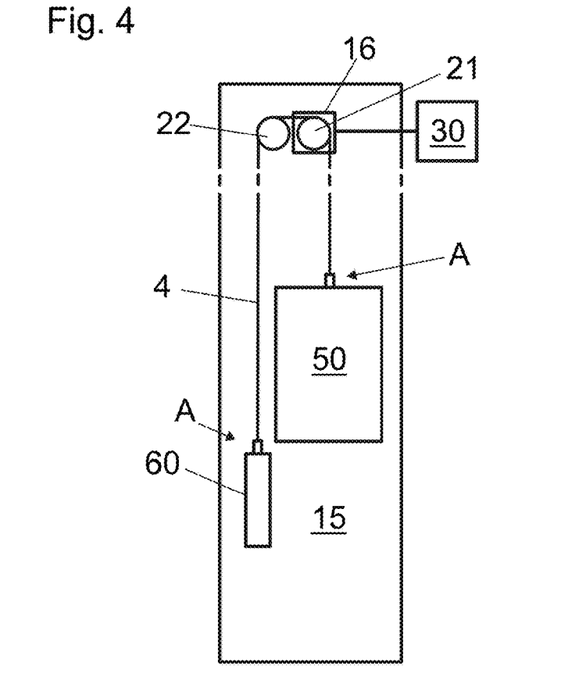
FIG. 4 illustrates an embodiment of a hoisting apparatus.

In the rope terminal arrangement A illustrated in FIG. 1, the rope gripping device 1 is arranged to fix an elongated rope 4 of the hoisting apparatus to a fixing base 50,60. The hoisting apparatus is preferably an elevator, as illustrated in FIG. 4. When the hoisting apparatus is an elevator the fixing base 50,60 is preferably an elevator car 50 or a counterweight 60 or a stationary structure of the building wherein the elevator is installed. In FIG. 4, a rope terminal arrangement A as described referring to FIG. 1, is used to fix a rope 4 to a car 50 and to a counterweight 60. Should the car 50 or counterweight 60 be suspended by the rope 4 via a diverting wheel, instead of what is shown in FIG. 4, e.g. if the suspension ratio of the car 50 or counterweight 60 would be 2:1, the fixing base could be a stationary structure of the building wherein the elevator is installed.

In the rope terminal arrangement A the rope 4 comprises on the front edge 5 side of the gripping face 3 a rope section of the rope 4, which is under tension. The tensioned rope section suspends one or more loads of a hoisting apparatus such as elevator. In the elevator of FIG. 4 implementing the arrangement A, the one or more loads include an elevator car 50 and a counterweight 60. In FIG. 1, the tensile force is illustrated by arrow F.

The elevator illustrated in FIG. 4 comprises a hoistway 15 and an elevator car 50 and a counterweight 60 vertically movable in the hoistway 15. The elevator further comprises one or more ropes 4, each suspending the car 50 and a counterweight 60 and having two end sections each fixed to a fixing base 50,60 with a rope gripping device 1 and terminal arrangement A as described earlier referring to FIG. 1.

The elevator illustrated in FIG. 4 is more specifically such that it comprises one or more upper rope wheels 21,22 mounted higher than the car 50 and the counterweight 60, in this case particularly in proximity of the upper end of the hoistway 15. In this case there are two of said rope wheels 21,22 but the elevator could be implemented also with some other number of rope wheels. Each of said one or more ropes 4 pass around said one or more rope wheels 21,22 mounted in proximity of the upper end of the hoistway 15. In the illustrated case, the one or more rope wheels 21,22 are mounted inside the upper end of the hoistway 15, but alternatively they could be mounted inside a space beside or above the upper end of the hoistway 15. Said one or more rope wheels 21,22 comprise a drive wheel 21 engaging said one or more hoisting ropes 4, and the elevator comprises a motor 16 for rotating the drive wheel 21. The elevator car 50 can be moved by rotating the drive wheel 21 engaging each of said ropes 4. The elevator further comprises an elevator control unit 30 for automatically controlling rotation of the motor 16, whereby the movement of the car 50 is also made automatically controllable. Each of said one or more ropes 4 is preferably belt-shaped and passes around the one or more rope wheels 21,22 turning around an axis extending in width direction w of the rope 4, the wide side thereof, i.e. the side facing in thickness direction t of the rope 4, resting against the one or more rope wheels 21,22.

Figure 5:
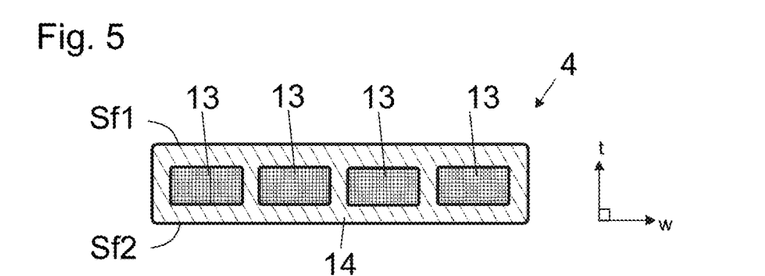
FIG. 5 illustrates preferred details of a cross-section of a rope of a hoisting apparatus.
Figure 6:
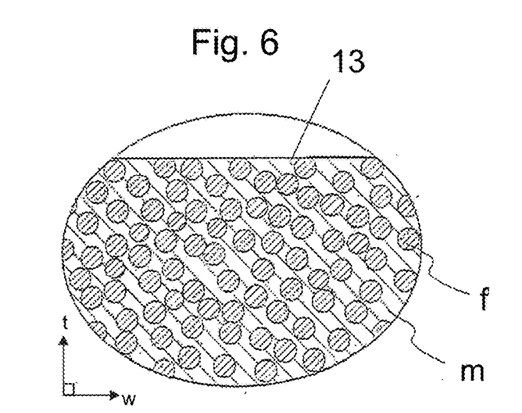
FIGS. 6 and 7 illustrate preferred details of a load bearing member of the rope of a hoisting apparatus.
Figure 7:
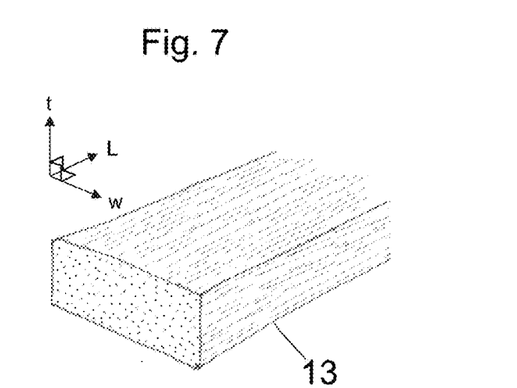

FIGS. 5-7 illustrate preferred further features of the rope 4. FIG. 5 illustrates a preferred structure of the rope 4. The rope 4 is belt-shaped. It is substantially larger in its width direction w than in its thickness direction t. The rope has two opposite side faces Sf1,Sf2 facing in thickness direction t of the rope 4. Wide structure provides that the rope 4 can be fixed firmly by pressing a rope gripping face 3 of a gripping member 2 against an elongated side face Sf1,Sf2 of the rope 4 without bending the rope 4, which would be disadvantageous if the rope has rigid and/or brittle elements, such as load bearing members. It is not necessary, but it is preferable, that the width/thickness ratio of the rope 4 is high, preferably at least 2 more preferably at least 4, or even more. In this way a large gripping area as well as a large cross-sectional area for the rope 4 is achieved, the bending capacity around the width-directional axis being favorable also with rigid materials of the load bearing members of the rope 4, such as composite material. Owing to the wide shape, the rope 4 suits very well to be used in hoisting appliances, in particular in elevators, wherein the rope 4 needs to be guided around rope wheels.

The rope 4 comprises one or more elongated load bearing members 13, which are embedded in a coating 14 forming the outer surface of the rope 4 and extend parallel to the longitudinal direction 1 of the rope 4 unbroken throughout the length of the rope 4. It is preferable that each load bearing member 13 is shaped wide, as illustrated. Accordingly, each of said one or more load bearing members 13 is preferably larger in its width direction w than in its thickness direction t of the rope 4. Particularly, the width/thickness ratio of each of said one or more load bearing members 13 is then preferably more than 2. Thereby, the bending resistance of the rope 4 is small but the load bearing total cross sectional area is vast with minimal non-bearing areas.

The coating 14 is preferably made of polymer material. With the coating 14, the rope 4 is provided with a surface via which the rope 4 can effectively engage frictionally with a drive wheel of an elevator, for instance. Also, hereby the friction properties and/or other surface properties of the rope are adjustable, independently of the load bearing function, such that the rope perform wells in the intended use, for instance in terms of traction for transmitting force in longitudinal direction of the rope so as to move the rope with a drive wheel. Furthermore, the load bearing members 13 embedded therein are thus provided with protection. The coating 14 can also be given a surface pattern, such as a tooth pattern or polyvee pattern, for instance facilitating its engagement with rope wheels having a counterpart surface pattern for the surface pattern of the rope 4.

The coating 14 is preferably elastic. Elastic polymer material, for example polyurethane provides the rope 4 the desired frictional properties simply, good wear resistance as well as efficient protection for the load bearing members 13. Polyurethane is in general well suitable for elevator use, but also materials such as rubber or silicon or equivalent elastic materials are suitable for the material of the coating 14. In the embodiment illustrated in FIG. 5, there are plurality of the load bearing members 13, which are adjacent each other in width direction w of the rope 4. In the present case, there are particularly four of said load bearing members 13 embedded adjacently in said coating 14, but the rope 4 could alternatively have any other number of load bearing members 13, such 2-10 load bearing members 13 embedded adjacently in said coating 14. The rope 4 could also be made to have only one load bearing member 13 or plurality of load bearing members 13 stacked in thickness direction t, for instance.

Said one or more load bearing members 13 is/are preferably, but not necessarily, made of composite material comprising reinforcing fibers f embedded in polymer matrix m, said reinforcing fibers preferably being carbon fibers. With this kind of structure, the rope 4 has especially advantageous properties in elevator use, such as light weight and good tensile stiffness in longitudinal direction. The load bearing members of this kind are being relatively brittle, e.g. when compared to steel, and prefer gentle fixing. For this reason, the rope gripping member 13, and the rope gripping device 1 and rope terminal arrangement A implementing it, as presented, are particularly advantageous in fixing of the rope 4. Also, the coating 14 can be safely made of sensitive material such as of polymer material.

FIG. 6 illustrates a preferred inner structure for said load bearing member 13, showing inside the circle an enlarged view of the cross section of the load bearing member 13 close to the surface thereof, as viewed in the longitudinal direction L of the load bearing member 13. The parts of the load bearing member 13 not showed in FIG. 6 have a similar structure. FIG. 7 illustrates the load bearing member 13 three dimensionally. The load bearing member 13 is made of composite material comprising reinforcing fibers f embedded in polymer matrix m. The reinforcing fibers f are more specifically distributed evenly in polymer matrix m and bound to each other by the polymer matrix m. This has been done e.g. in the manufacturing phase by immersing them together in the fluid material of the polymer matrix which is thereafter solidified. The load bearing member 13 formed is a solid elongated rod-like one-piece structure. Said reinforcing fibers f are most preferably carbon fibers, but alternatively they can be glass fibers, or possibly some other fibers. Preferably, the reinforcing fibers f of each load bearing member 13 are parallel with the longitudinal direction of the load bearing member 13. Thereby, the fibers f are also parallel with the longitudinal direction of the rope 4 as each load bearing member 13 is oriented parallel with the longitudinal direction of the rope 4. This is advantageous for the rigidity as well as non-chafing behavior in bending. Owing to the parallel structure, the fibers in the rope 4 will be aligned with the force when the rope 4 is pulled, which ensures that the structure provides high tensile stiffness. The fibers f used in the preferred embodiments are accordingly substantially untwisted in relation to each other, which provides them said orientation parallel with the longitudinal direction of the rope 4. This is in contrast to the conventionally twisted elevator ropes, where the wires or fibers are strongly twisted and have normally a twisting angle from 15 up to 40 degrees, the fiber/wire bundles of these conventionally twisted elevator ropes thereby having the potential for transforming towards a straighter configuration under tension, which provides these ropes a high elongation under tension as well as leads to an unintegral structure. The reinforcing fibers f are preferably long continuous fibers in the longitudinal direction of the load bearing member 13, preferably continuing for the whole length of the load bearing member 13.

The composite matrix m, into which the individual fibers f are distributed, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but any other suitable alternative materials can be used.

The matrix m of the load bearing member 13 is most preferably hard in its material properties. A hard matrix m helps to support the reinforcing fibers f, especially when the rope bends, preventing buckling of the reinforcing fibers f of the bent rope, because the hard material supports the fibers f efficiently. The most preferred materials for the matrix are epoxy resin, polyester, phenolic plastic or vinyl ester. The polymer matrix m is preferably so hard that its module of elasticity (E) is over 2 GPa, most preferably over 2.5 GPa. In this case the module of elasticity E is preferably in the range 2.5-10 GPa, most preferably in the range 2.5-4.5 GPa. There are commercially available various material alternatives for the matrix m which can provide these material properties. However, the polymer matrix need not be this hard necessarily, e.g. if the downsides of a softer material are deemed acceptable or irrelevant for the intended use. In that case, the polymer matrix m can be made of elastomer material such as polyurethane or rubber, for instance. Preferably over 50% proportion of the surface area of the cross-section of the load bearing member 14 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining surface area is of polymer matrix m. Most preferably, this is carried out such that approx. 60% of the surface area is of reinforcing fiber and approx. 40% is of matrix material (preferably epoxy material). In this way a good longitudinal stiffness for the load bearing member 14 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well. The load bearing members 13 are preferably each completely non-metallic, i.e. made not to comprise metal.

The matrix bound fiber composite material of the load bearing members 13, the kind of reinforcing fibers f, the untwisted structure of the load bearing members 13 and the coating are each prone to make the rope 4 more sensitive for excessive local shear stresses and local compression. The load bearing members moreover do not well tolerate bending. Hereby, the rope gripping member 13, and the rope gripping device 1 and rope terminal arrangement A implementing it, as presented, are particularly advantageous in fixing of the rope 4 as described referring to FIGS. 5-7.

A rope gripping member 2 as described above is advantageous not only in terms of reduced creep but also in terms of better equalized internal stress distribution produced in the load bearing members 13 of the rope 4, and particularly so when the load bearing members 13 are made of composite material as described referring to FIGS. 5-7. In gripping, force is transferred from the gripping members 2 to tension in individual reinforcing fibers f through shear stresses of the coating 14 and the matrix m. Due to elastic deformation of the reinforcing fibers f and the matrix m, the outermost fibers bear the greatest load at locations close to the front edge 5 of the gripping face 3. In addition, the outermost matrix layers are subjected to the highest shear stress. Uneven stress distribution inside the load bearing member limits rope breaking load, since the breakage begins from the outermost fibers and matrix layers. Due to better equalized over the contact length between the gripping member and the rope, this problem can be alleviated as well. Particularly, harmful force peaks in the outermost fibers of the load bearing members 13 close to the front edge 5 of the gripping face 3 can be eliminated. This means more equal internal stress distribution within the load bearing members 13 and thereby increased breaking load of the rope 4.

In the illustrated embodiments, the load bearing members 13 are substantially rectangular and larger in width direction than thickness direction. However, this is not necessary as alternative shapes could be used.

In the preferred embodiments, an advantageous structure for the rope 4 has been disclosed. However, the invention can be utilized with also other kind of ropes such as with other kinds of belt-shaped ropes having different materials. Also, the outer shape of the rope 4 could be contoured otherwise than disclosed, such as to have a polyvee shape or toothed shape as mentioned.

As mentioned, FIGS. 3a and 3b illustrate a rope gripping member 2 where it comprises plurality of cavities 20. In the embodiment of FIGS. 3a and 3b, the cavities have been shaped and placed such that the cross sectional area of the rope gripping member 2 increases between the front edge 5 and the rear edge 6 of the gripping face 3 with accelerating rate. In the case of the embodiment of FIGS. 3a and 3b this is advantageous since the rope gripping member 2 is made of one material. This is however not necessary since the stiffness can be adjusted by changing material composition of the rope gripping member 2 as function of x such that a desired tensile stiffness-plot is achieved.

Generally, in order to adjust the cross sectional area of the rope gripping member 2 to increase between the front edge 5 and the rear edge 6 of the gripping face 3 with accelerating rate it is preferred that the rope gripping member 2 is made to comprise one or more of the following:
- plurality of cavities of different lengths (as measured in direction L) at different points along the length of the rope gripping face 3,
- plurality of cavities of different widths (as measured in direction w) at different points along the length of the rope gripping face 3, or a single cavity the width of which is different at different points along the length of the rope gripping face (3),
- plurality of cavities of different thickness (as measured in direction t) at different points along the length of the rope gripping face 3 or a single cavity the thickness of which is different at different points along the length of the rope gripping face 3,
- plurality of cavities of different volume at different points along the length of the rope gripping face 3 or a single cavity the cross sectional area of which is different at different points along the length of the rope gripping face 3.

Figure 8:
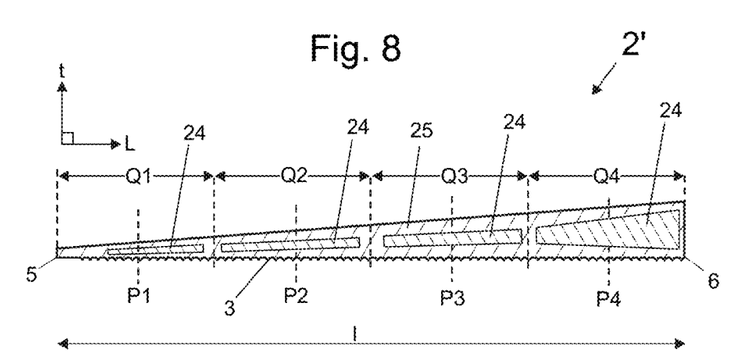
FIG. 8 illustrates a cross-section of a second embodiment of a gripping member of as viewed from a lateral side.

FIG. 8 illustrates an embodiment, where the rope gripping member 2' comprises base material portion 25 and stiffness adjusting material parts 24, wherein material of said stiffness adjustment material parts 24 has substantially higher module of elasticity than the material of the base material portion 25, and the cross-sectional area (the cross-section as viewed in direction L) of the adjusting material parts 24 changes as function of x such that the tensile stiffness of the rope gripping member 2' as measured in longitudinal direction L of the gripping face 3 increases non-linearly with accelerating rate from the front edge 5 towards the rear edge 6 of the gripping face 3. Preferably, this is implemented such that the cross-sectional area covered by the adjusting material parts 24 increases towards the rear edge 6 as function of x. As an alternative, this adjusting by material distribution of different materials, could be made with stiffness adjustment material parts which have substantially lower module of elasticity than the material of the base material portion 25. In that case, the cross-sectional area covered by the adjusting material parts 24 would be preferable decrease towards the rear edge 6 as function of x. In the presented example said stiffness adjustment material parts 24 have been embedded in the base material 25. The rope gripping member 2' differs from the rope gripping member 2 illustrated in FIG. 3a only in that the stiffness thereof has been adjusted differently. The stiffness thereof preferably increases more specifically as described referring to the rope gripping member 2 and FIG. 2.

Figure 9:
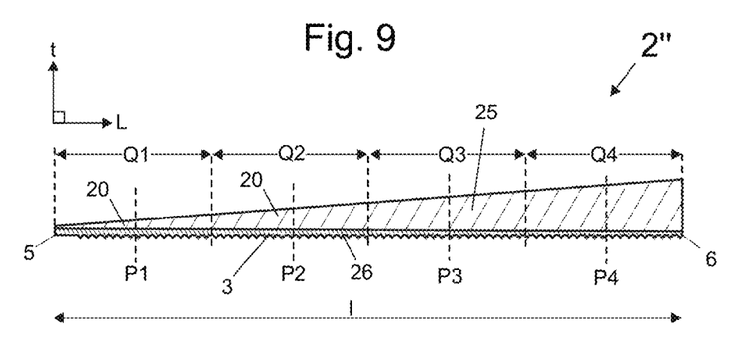
FIG. 9 illustrates a cross-section of a third embodiment of a gripping member of as viewed from a lateral side.

FIG. 9 illustrates an embodiment, where the rope gripping member 2" comprises base material portion 25 and stiffness adjusting material part 26 forming a layer of the rope gripping member 2", wherein material of said stiffness adjustment material part 26 has substantially lower (or alternatively higher) module of elasticity than the material of the base material portion 25, and the cross-sectional area (the cross-section as viewed in direction L) covered by the adjusting material part 26 changes as function of x such that the tensile stiffness of the rope gripping member 2" as measured in longitudinal direction L of the gripping face 3 increases non-linearly with accelerating rate from the front edge 5 towards the rear edge 6 of the gripping face 3. This is implemented in FIG. 9 such that the cross-sectional area covered by the adjusting material part 26, i.e. the thickness of the layer formed by it, decreases towards the rear edge 6 as function of x. The thickness could be made to decrease non-linearly if this is needed to obtain the desired tensile stiffness-plot. As an alternative, this adjusting by material distribution with different material layers, could be made with stiffness adjustment material part which has substantially higher module of elasticity than the material of the base material portion 25. In that case, the cross-sectional area covered by the adjusting material parts 26 would be preferable to increase from the front edge 5 towards the rear edge 6 as function of x. In the example presented in FIG. 8, said stiffness adjustment material part 26 comprises the gripping face 3. This is however not necessary since this layer could alternatively be placed elsewhere such as on the back side of the gripping member 2. There could also be additional layers or parts in addition to what is shown. The rope gripping member 2" differs from the rope gripping member 2 illustrated in FIG. 3a only in that the stiffness thereof has been adjusted differently. The stiffness thereof preferably increases more specifically as described referring to the rope gripping member 2 and FIG. 2.

The tensile stiffness of the rope gripping member 2 in longitudinal direction L of the gripping face 3 can be determined by measuring or by calculations. The tensile stiffness of the rope gripping member 2 in longitudinal direction L of the gripping face 3 is particularly measurable by a testing arrangement where strain gauges are positioned on the gripping face 3, preferably simultaneously or sequentially, at different points of the gripping face 3 in direction L to measure strain in this direction when a pull is directed on the rope gripping member 2 in this direction.

Generally, if and when the rope gripping member 2 has been formed by injection molding, it is preferably provided with a marking, preferably made by injection molding but alternatively by other means such as by printing, which marking is preferably a marking indicating the manufacturing time (e.g. a time stamp) of the rope gripping member 2 in question or a marking indicating the replacement time (e.g. a planned or a recommended replacement date) of the rope gripping member 2 in question or an identification code identifying the rope gripping member 2 in question. Providing a marking indicating manufacturing time or a replacement time of the rope gripping member 2 in question is advantageous since material of the gripping member may, particularly when it comprises polymer material, age such that its properties are changes so that it needs to be replaced. For determining the correct time for such a replacement, the date of manufacturing is preferably available. Providing a marking which is an identification code identifying the rope gripping member 2 in question makes it possible to check from a database the manufacturing time of the rope gripping member 2 in question or a predetermined replacement time, such as planned or recommended replacement date, of the rope gripping member 2 in question.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A rope gripping member for a rope gripping device, the rope gripping member comprising an elongated rope gripping face for being pressed against an elongated side face of an end section of a rope, the elongated rope gripping face having a longitudinal direction and a front edge and a rear edge;

wherein tensile stiffness of the rope gripping member in longitudinal direction of the gripping face increases non-linearly with accelerating rate from the front edge towards the rear edge of the gripping face.

2. The rope gripping member according to claim 1, wherein steepness of the tensile stiffness-plot of the rope gripping member increases from the front edge towards the rear edge of the gripping face, said tensile stiffness-plot presenting tensile stiffness of the gripping member in longitudinal direction in different points along longitudinal direction of the gripping face.

3. The rope gripping member according to claim 1, wherein said different points are displaced along the length of the rope gripping face and include a point within the first quarter of the rope gripping face, a point within the second quarter of the rope gripping face, and a point within the third quarter of the rope gripping face, and a point within the fourth quarter of the rope gripping face.

4. The rope gripping member according to claim 1, wherein each said point is located within the central third of the quarter as seen in longitudinal direction of the rope gripping face.

5. The rope gripping member according to claim 1, wherein the rope gripping member is wedge-shaped.

6. The rope gripping member according to claim 1, wherein the rope gripping member is made of composite material or at least comprises composite material, the composite material preferably comprising reinforcing fibers embedded in polymer matrix, said reinforcing fibers preferably being non-metallic fibers, preferably carbon fibers or glass fibers.

7. The rope gripping member according to claim 1, wherein at least majority of the reinforcing fibers of the rope gripping member are 0.1 mm-1.0 mm long.

8. The rope gripping member according to claim 1, wherein the gripping face is planar.

9. The rope gripping member according to claim 1, wherein the rope gripping member comprises one or more cavities.

10. The rope gripping member according to claim 9, wherein the ratio Vc/Vs, wherein Vc is the overall volume of the cavities of a quarter, and Vs is the overall volume of the solid parts of the quarter in question, varies between said quarters, the ratio being smallest in the fourth quarter.

11. The rope gripping member according to claim 1, wherein cross sectional area of the rope gripping member increases between the front edge and the rear edge of the gripping face with accelerating rate.

12. The rope gripping member according to claim 1, wherein the rope gripping member comprises one or more of the following:

plurality of cavities of different lengths at different points along the length of the rope gripping face, plurality of cavities of different widths at different points along the length of the rope gripping face, or a single cavity the width of which is different at different points along the length of the rope gripping face, plurality of cavities of different thickness at different points along the length of the rope gripping face or a single cavity the thickness of which is different at different points along the length of the rope gripping face, plurality of cavities of different volume at different points along the length of the rope gripping face or a single cavity the cross sectional area of which is different at different points along the length of the rope gripping face.

13. The rope gripping member according to claim 1, wherein the rope gripping member comprises a base material portion and one or more stiffness adjusting material parts, wherein material of said one or more stiffness adjustment material parts has substantially lower or higher module of elasticity than the material of the base material portion, and the cross-sectional area covered by the one or more adjusting material parts changes as function of x such that the tensile stiffness of the rope gripping member in longitudinal direction of the gripping face increases non-linearly with accelerating rate from the front edge towards the rear edge of the gripping face.

14. The rope gripping member according to claim 1, wherein the rope gripping member comprises base material portion and stiffness adjusting material part forming a layer of the rope gripping member, wherein material of said stiffness adjustment material part has substantially lower or higher module of elasticity than the material of the base material portion, and the cross-sectional area covered by the adjusting material part changes as function of x such that the tensile stiffness of the rope gripping member in longitudinal direction of the gripping face increases non-linearly with accelerating rate from the front edge towards the rear edge of the gripping face.

15. The rope gripping device comprising
a frame;
one or more rope gripping members according to claim 1 mounted or at least suitable for being mounted on the frame.

16. A rope terminal arrangement comprising
the rope gripping device according to claim 1, and
the elongated rope, a gripping face of each rope gripping member being pressed against an elongated side face of an end section of the rope.

17. The rope terminal arrangement according to claim 1, wherein the rope is a coated rope.

18. The rope terminal arrangement according to claim 1, wherein the rope comprises one or more elongated load bearing members embedded in a coating and extending parallel with the longitudinal direction of the rope unbroken throughout the length of the rope.

19. The rope terminal arrangement according to claim 1, wherein each said load bearing member is made of composite material comprising reinforcing fibers embedded in polymer matrix, said reinforcing fibers preferably being carbon fibers.

20. A hoisting apparatus comprising the rope gripping device or rope terminal arrangement as defined in claim 1.

* * * * *